United States Patent [19]

McInnis et al.

[11] Patent Number: 5,382,635

[45] Date of Patent: Jan. 17, 1995

[54] HIGHER MODULUS COMPOSITIONS INCORPORATING PARTICULATE RUBBER

[75] Inventors: Edwin L. McInnis, Allentown, Pa.; Robert P. Scharff, Louisville, Ky.; Bernard D. Bauman, Emmaus; Mark A. Williams, Souderton, both of Pa.

[73] Assignee: Composite Particles, Inc., Allentown, Pa.

[21] Appl. No.: 129,227

[22] Filed: Sep. 29, 1993

Related U.S. Application Data

[63] Continuation of Ser. No. 842,815, Feb. 27, 1992, abandoned.

[51] Int. Cl.$^6$ .............................................. C08F 8/06
[52] U.S. Cl. .................................. 525/356; 525/332.8; 525/332.4; 525/333.1; 525/333.2; 521/42.5
[58] Field of Search ...................... 525/356; 521/42.5

[56] References Cited

U.S. PATENT DOCUMENTS

| | | | |
|---|---|---|---|
| 3,553,857 | 1/1971 | Pettit et al. | 36/32 |
| 4,501,859 | 2/1985 | Newman et al. | 525/356 |
| 4,710,538 | 12/1987 | Jorgensen | 525/53 |
| 4,771,110 | 9/1988 | Bauman et al. | 525/131 |
| 4,992,513 | 2/1991 | Bauer et al. | 525/184 |
| 4,996,262 | 2/1991 | Pyke et al. | 525/177 |

FOREIGN PATENT DOCUMENTS

| | | |
|---|---|---|
| 433313 | 8/1935 | United Kingdom. |
| 2025321 | 1/1980 | United Kingdom. |

OTHER PUBLICATIONS

J. Harper Tervet, et al, "Chlorinolysis Reclaims Rubber of Waste Tires", NASA Tech Brief, vol. 5, No. 3, Item 55 (Jan., 1981).

K. Kinoshita, "Treatment of Rubber Vulcanizate with Chlorine, Gas or Hydrogen Chloride Gas," Chem Abstracts, vol. 78, No. 14 (1972) Columbus.

Primary Examiner—Bernard Lipman
Attorney, Agent, or Firm—Sanford J. Piltch

[57] ABSTRACT

Rubber particles, to be used as fillers or extenders for various composite polymer systems, are chlorinated by a gas-solid phase reaction with a chlorine-containing gas. A composite polymer containing the chlorinated rubber fillers or extenders exhibits a higher flexural modulus than if prepared using an unchlorinated rubber filler or extender. Chlorination of the rubber particles is carried out by contacting the finely divided rubber particles with a chlorine-containing gas comprising at least about 5 volume percent chlorine. Advantageously, the chlorine can be diluted with air, nitrogen or other essentially inert gases and may contain minor amounts of fluorine. Improved performance is obtained with nitrogen dilution of the chlorine gas over air dilution. Improved polymer composite systems having higher flexural modulus result from the use of the chlorinated rubber particles as fillers instead of unchlorinated rubber particles.

4 Claims, 2 Drawing Sheets

HIGHER MODULUS COMPOSITIONS INCORPORATING PARTICULATE RUBBER

The Government of the United States of America has rights in this invention pursuant to Contract No. DE-AC07-88ID12695 awarded by the U.S. Department of Energy.

This is a continuation of application Ser. No. 07/842,815 filed Feb. 27, 1992, now abandoned.

FIELD OF THE INVENTION

This invention relates to a method for treating vulcanized crumb rubber to be used as a filler or extender in other polymeric resin systems to improve the stiffness, or modulus, of the rubber material to improve the overall modulus of the resulting polymeric resin system incorporating the rubber filler. One source of such crumb rubber is the recycling of used automotive tires.

Various efforts have explored means to improve the recovery or usefulness of rubber reclaimed from automotive tires or other applications. Many of these processes are directed to the devulcanization of the rubber, such as the solvent chlorinolysis process described in a publication on "Chlorinolysis Reclaims Rubber of Waste Tires", J. H. Tervet, G. G. Hull and E. R. DuFresne in NASA Tech Brief Vol. 5, No. 3, Item 55 (January 1981).

In general, use of reclaimed or other crumb rubber is limited by the low stiffness or modulus of the rubber. Additional uses can be realized and improved polymer systems benefitting from the inclusion of elastomeric rubber fillers or extenders if the rubber stiffness, or modulus, could be increased. Such high modulus rubber could be used polyurethane and polyester systems. With fillers of the present invention, rubber reclaimed from used tires may effectively and economically be used as fillers and extenders in substitution for high cost polymers while at the same time effecting the environmentally friendly recycling of the used tires. Other means of producing high modulus rubbers have been described in U.S. Pat. Nos. 4,992,513 and 4,996,262 for producing rubbers having a high modulus by grafting either nylon or polyester onto the rubber. Other methods have used halogenation of the surfaces of rubbers to improve surface adhesion to other polymers. Examples of such treatments are described in U.S. Pat. No. 4,771,110 (use of fluorine) and U.S. Pat. No. 3,553,857 (surface halogenation with bromine or chlorine to improve adhesion).

SUMMARY OF THE INVENTION

This invention provides a relatively easy and inexpensive means for substantially increasing the stiffness, as measured by the Young's modulus, of the bulk of a ground or crumb vulcanized rubber by a gas-solid phase treatment of the rubber with chlorine gas, preferably in a chlorine/air or, even more preferably, in a chlorine/nitrogen mixture. No special pretreatment of the rubber is required. The reaction of the rubber with the chlorine gas mixture can be carried out in any suitable reactor. Since solvents are not used, the expense of solvent handling, recovery and drying are avoided.

This invention is carried out by treating the crumb rubber, which can be in a crumb, pulverized or finely ground state, with a chlorine-containing gas. The treatment is carried out in a reactor in which the pulverized rubber is contacted with the chlorine-containing gas at a temperature from about 32° F. (0° C.) to about 200° F. (93.3° C.), with the reaction pressure being preferably within the range of from about 1 atm to about 10 atm. The chlorine-containing gas will generally comprise from about 5% chlorine by volume to substantially pure chlorine. Preferably the chlorine concentration is in the range of from about 8% to about 50% by volume although such concentrations are not deemed critical. Since the diffusion and reaction rates of the chlorine within the rubber particles is a function of the concentration and pressure of the chlorine, the more encompassing definition of preferable chlorine concentrations for treating the rubber would be the partial pressure of the chlorine. Measured in this manner, the partial pressure of the chlorine should preferably be within the range of from about 0.05 atmospheres absolute (corresponding to a 5% concentration of chlorine in a system at atmospheric pressure) to about 0.5 atm. absolute. The other components, referred to as diluents, of the chlorine-containing gas may comprise air or inert gases such as nitrogen. Preferably the diluent comprises substantially nitrogen. The contact time will depend upon the size of the rubber particles, since the gas must diffuse into the bulk of the particles, and also upon the reaction gas chlorine concentration, temperature and pressure, but is generally in the range of from about 20 seconds to about 60 minutes. Certain reaction conditions, such as higher temperature, pressure or chlorine partial pressure, could result in shorter required exposure times for desired modulus increases. The chlorine-containing gas may be used in either a batch reaction mode with an initial charge of gas containing sufficient chlorine for treatment or may be added continuously throughout the reaction. Contact between the chlorine-containing gas and the rubber particles is best achieved by tumbling the rubber particles within the reactor or by using the chlorine-containing gas to fluidize the rubber particles. In other embodiments, both the chlorine-containing gas and rubber particles may be continuously added to and taken from the reactor. After a suitable reaction time, the treated rubber is separated from the chlorine-containing gas and is purged of unreacted chlorine-containing gas by a suitable purge gas, preferably either an air or nitrogen purge.

In addition to the chlorine gas component, it has been found advantageous for the treatment gas to contain a minor amount of fluorine gas. While not necessary to the effective treatment of the rubber using chlorine, the presence of from about 1 to 2 percent by volume of fluorine in the chlorine-containing gas accelerates the treatment process.

The chlorine treated rubber may then be used as a filler or extender in other polymer systems, such as polyurethanes, polyesters, epoxies, nyrim (reaction injection molded nylon), silicone-based polymers, polycarbonates, phenolics, acrylics, polysulfide and other systems requiring a rubber filler of high modulus.

This invention encompasses the chlorine-treated rubber filler materials having a high modulus, the method for making such high-modulus rubber fillers, and composite polymer systems incorporating the high modulus, chlorine-treated rubber fillers and extenders.

DETAILED DESCRIPTION OF THE INVENTION

Figure 1:
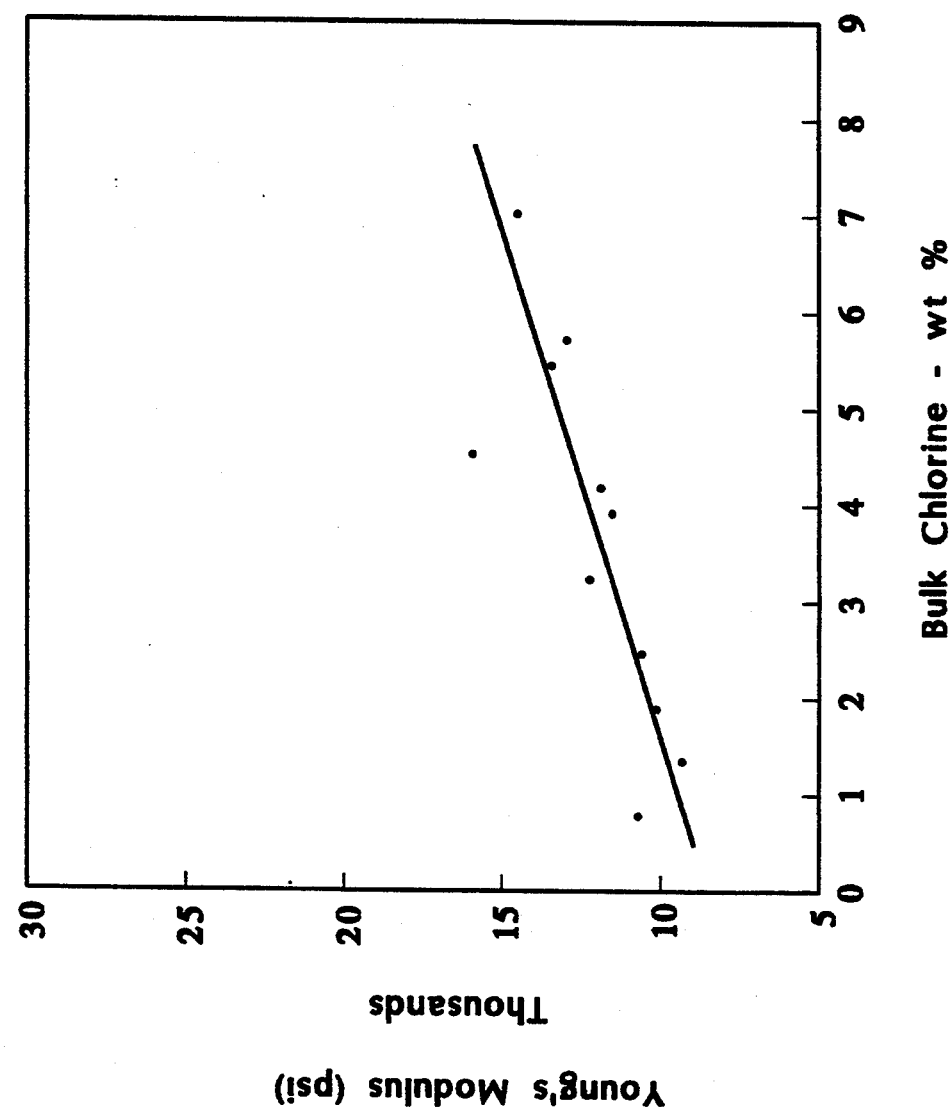
FIG. 1 is a graph of the Young's modulus of the treated rubber as a function of the bulk chlorine content of the treated rubber which has been treated in a chlorine/air mixture.

This invention provides for the modification of rubber materials used as fillers or extenders for other polymer materials to increase the stiffness, measured by the Young's modulus, of the polymer and treated rubber composite material. Young's modulus is defined as a material's resistance to deformation, or stiffness, and is specifically defined as the initial rate of deformation to strain measured by taking the slope of the stress-strain curve in the region of a very small strain. Young's modulus may be measured in accordance with ASTM Method D-638. This increase in the modulus of the composite polymer and treated rubber material makes the treated rubber material suitable for additional use as a filler or extender in composite polymeric materials without excessive decrease in the modulus of the composite polymer which would be normally incident to the use of untreated rubber of the type obtained from automotive tires. In fact, with highly chlorinated rubber particles, the composite may have flexural moduli higher than the host polymer.

Such composite polymers would have substantial uses at considerable cost and energy savings. The treated rubber extender made by chlorinating reclaimed tire rubber powder would cost less than about one half to one fourth of the cost of the host polymers. Since it may be substituted in the polymer as an extender or filler at ratios of up to 70% or even higher, depending upon application and polymer system, while maintaining acceptable physical properties, substantial savings will accrue. Possible uses of the chlorinated rubber and polyurethane composite materials are automotive door and window seals, shoe soles, carpet underlay, rollers and solid tires.

The process consists of exposing finely ground rubber particles to chlorine gas, either alone or diluted with another gas. The two most economical gases for such dilution are air and nitrogen, although other relatively inert gases may be used. It will be seen however, that using an inert gas such as nitrogen results in an accelerated chlorination rate and therefore an improved modulus of the ground rubber particles.

The rubber is generally ground to a particle size of from about 40 mesh U.S. standard, to about 200 mesh U.S. standard, preferably in the range of 80 mesh to about 100 mesh. This grinding can be accomplished in any number of conventional grinding and size reduction processes or machines. The particle size to which the rubber is ground will depend upon the intended application of the rubber as a filler or extender. However, the finer the particle size, the more rapid the subsequent chlorination treatment as to improve the bulk modulus of the rubber particles, the treatment process must be allowed sufficient reaction time to enable the chlorine to diffuse and penetrate into the bulk of the rubber particles. Finer particle size provides a higher surface to volume ratio and reduces the required diffusion or penetration distance into the particle interior. The finely divided rubber particles are exposed to the chlorine-containing atmosphere in a suitable reactor in which the rubber powder may be agitated by stirring, tumbling or by fluidization or agitation by the chlorine-containing gas. The treatment may be carried out by any suitable method of contacting the chlorine-containing gas with the powder. The reactor may be charged with a batch of rubber powder and an initial charge of chlorine-containing gas and operated in a batch mode. Alternatively, the chlorine-containing gas may be continuously circulated through the reactor, with or without addition or replenishment of the contained chlorine gas. When used in a continuous addition or recirculation mode, the chlorine-containing gas may advantageously be used to fluidize the rubber powder. Constant recirculation also permits the most efficient use of the contained chlorine and facilitates environmental control. In addition, it is possible to perform the rubber treatment in a fully continuous mode, where chlorine-containing gas and rubber particles are continuously added to and removed from the reactor. To process the rubber safely, the reactor used should be capable of venting dust explosion pressures of up to ten times the starting pressure. Vessels should be designed in accordance with NFPA 68 for ST-1 class dust explosions.

The chlorine concentration in the chlorine-containing gas is generally in the range of from about 5% by volume up to 100%. Generally, a preferred concentration range for the chlorine is from about 10% to about 50% by volume. Higher concentrations of chlorine in the treating gas generally require shorter treatment times. With chlorine concentrations of from about 10% to about 50%, with particle sizes generally in the range of from about 80 mesh to about 100 mesh, and at treatment temperatures in the range of from about 50° F. (10° C.) to about 90° F. (32° C.), treatment times are generally of the order of 1 to 10 minutes for batch reactors. Continuous treatment times can be of 20 to 60 seconds residence time.

After an adequate treatment time in the presence of the chlorine-containing gas, the treated rubber particles are separated from the chlorine-containing gas and the treated rubber particle mass are purged of the chlorine-containing gas, generally with air or nitrogen. During such purging, agitation of the powder is continued to assure full removal of the chlorine-containing gas from the powder mass. Once purged of the chlorine-containing gas, the rubber particles may be used as fillers or extenders, in conventional manner, with various polymer systems, but with the result of higher bulk modulus of the resulting composite polymer than if untreated rubber particles were used for filler or extender.

EXAMPLES

Rubber Chlorination

Samples of rubber obtained from reclaimed automotive tires were subjected to the chlorine treatment of this invention in a reactor for contacting the rubber with the chlorine-containing gas at atmospheric pressure and ambient temperature. Suitable reactors would include a Rota-Cone ™ reactor manufactured by Paul O. Abbe Corp. or a fluidized bed-type reactor. In this example, the reactor consisted of a 316 stainless steel pipe, 6 inches in diameter and 12 inches long. It was fitted with flanges at both ends. Through the top end, a mechanical stirrer entered the reactor. At the bottom end, a sintered, porous stainless steel plate would support the rubber particles while distributing the reactant gas entering from below. The reactor was water jacketed to control the reactor temperature and to remove the exothermic reaction heat.

Chlorine-containing gas was delivered to the reactor throughout the reaction period at rates from 0.20 to 0.49 SCF/min. Temperature of the reactions was at approximately 70° F. (21° C.). The pressure of the reactor was maintained at atmospheric pressure. Gas compositions of from 8–40% $Cl_2$ in air or $N_2$ at atmospheric pressure were evaluated. Treatment levels of 0.02–3.63 SCF $Cl_2$/lb of rubber were used. At equal treatment levels (SCF $Cl_2$/lb rubber), shorter exposure times with higher chlorine concentration in gas) leads to higher bulk chlorine in the treated rubber (Run 3 compared to Run 8; Run 6 vs. Run 12 Run 1 vs. Run 2; and Run 4 vs. Run 5) for both diluent gases.

Examples of exposure regimens with the resulting bulk chlorine content in the treated rubber, as measured by elemental combustion analysis, are as follows:

| Run | % Cl in gas | Diluent gas | Total CFM gas | SCF $Cl_2$/ lb rubber | Reaction Time (sec) | Bulk % Cl |
|---|---|---|---|---|---|---|
| 1 | 20.0 | Air | 0.2 | 0.182 | 180 | 2.42 |
| 2 | 40.0 | Air | 0.2 | 0.182 | 90 | 4.08 |
| 3 | 40.0 | Air | 0.2 | 0.364 | 180 | 5.38 |
| 4 | 9.2 | $N_2$ | 0.42 | 0.182 | 180 | 1.47 |
| 5 | 25.0 | $N_2$ | 0.32 | 0.182 | 90 | 1.95 |
| 6 | 25.0 | $N_2$ | 0.32 | 0.364 | 180 | 3.23 |
| 7 | 28.6 | Air | 0.28 | 0.04 | 20 | 1.38 |
| 8 | 28.6 | Air | 0.28 | 0.364 | 180 | 3.87 |
| 9 | 28.6 | Air | 0.28 | 1.09 | 540 | 5.58 |
| 10 | 28.6 | Air | 0.28 | 3.63 | 1800 | 6.96 |
| 11 | 28.6 | $N_2$ | 0.28 | 0.04 | 20 | 1 |
| 12 | 28.6 | $N_2$ | 0.28 | 0.364 | 180 | 4.19 |
| 13 | 28.6 | $N_2$ | 0.28 | 1.09 | 540 | 7.03 |
| 14 | 28.6 | $N_2$ | 0.28 | 3.63 | 1800 | 7.96 |
| 15 | 8.2 | $N_2$ | 0.49 | 0.02 | 20 | 0.62 |
| 16 | 8.2 | $N_2$ | 0.49 | 0.182 | 180 | 1.83 |
| 17 | 8.2 | $N_2$ | 0.49 | 0.545 | 540 | 2.92 |
| 18 | 8.2 | $N_2$ | 0.49 | 1.8165 | 1800 | 4.01 |
| 19 | 9.5 | Air | 0.42 | 0.02 | 20 | 0.74 |
| 20 | 9.5 | Air | 0.42 | 0.182 | 180 | 1.89 |
| 21 | 9.5 | Air | 0.42 | 0.545 | 540 | 3.19 |
| 22 | 9.5 | Air | 0.42 | 1.8165 | 1800 | 4.37 |
| 23 | — | — | — | — | — | <0.3 |

Various host polymer systems were composited using chlorinated rubber fillers prepared according to the above examples. Examples of these systems and a comparison of their flexural strength and flexural modulus were made using unchlorinated rubber powder and chlorinated rubber powder as filler in the host polymers.

Urethane Composites

Urethane elastomers containing 15 weight percent of powdered rubber modified according to this invention were prepared using Airthane™ PET 95A urethane resin (Air Products and Chemicals, Inc.) and Ethacure™ 300 (Ethyl Corporation) cross-linker. The urethane elastomers were prepared by combining the identified rubber with preheated resin at 70°–80° C. with thorough mixing. Entrained air was removed by vacuum until no further outgassing occurred. The resin was then placed in an oven until the mixing temperature of about 85° C. was reached. The resin was then combined with sufficient crosslinker to give an index of 1.05 (equivalent to amine/NCO stoichiometry ratio of 0.95). After thorough mixing, the blend was again degassed and then placed in a mold. The sample was cured at 100° C. for 16 hours. The finished specimens were removed from the mold and post-cured for two weeks at room temperature prior to testing. The following results were obtained in accordance with ASTM D-638.

| Run No. | % Cl in gas | Diluent gas | SCF $Cl_2$/ lb rubber | Reaction Time (sec) | Bulk % Cl | Young's Modulus |
|---|---|---|---|---|---|---|
| 19 | 9.5 | Air | 0.02 | 20 | 0.74 | 73.8 |
| 7 | 28.6 | Air | 0.04 | 20 | 1.38 | 64.1 |
| 20 | 9.5 | Air | 0.182 | 180 | 1.89 | 69.2 |
| 1 | 20.0 | Air | 0.182 | 180 | 2.42 | 72.4 |
| 21 | 9.5 | Air | 0.545 | 540 | 3.19 | 89.1 |
| 8 | 28.6 | Air | 0.364 | 180 | 3.87 | 79.9 |
| 2 | 40.0 | Air | 0.182 | 90 | 4.08 | 81.4 |
| 22 | 9.5 | Air | 1.8165 | 1800 | 4.37 | 114.0 |
| 3 | 40.0 | Air | 0.364 | 180 | 5.38 | 95.7 |
| 9 | 28.6 | Air | 1.09 | 540 | 5.58 | 92.5 |
| 10 | 28.6 | Air | 3.63 | 1800 | 6.96 | 103.2 |
| 15 | 8.2 | $N_2$ | 0.02 | 20 | 0.62 | 136.8 |
| 11 | 28.6 | $N_2$ | 0.04 | 20 | 1 | 76.1 |
| 4 | 9.2 | $N_2$ | 0.182 | 180 | 1.47 | 68.1 |
| 16 | 8.2 | $N_2$ | 0.182 | 180 | 1.83 | 111.2 |
| 5 | 25.0 | $N_2$ | 0.182 | 90 | 1.95 | 68.1 |
| 17 | 8.2 | $N_2$ | 0.545 | 540 | 2.92 | 124.1 |
| 6 | 25.0 | $N_2$ | 0.364 | 180 | 3.23 | 74.1 |
| 18 | 8.2 | $N_2$ | 1.8165 | 1800 | 4.01 | 150.2 |
| 12 | 28.6 | $N_2$ | 0.364 | 180 | 4.19 | 112.0 |
| 13 | 28.6 | $N_2$ | 1.09 | 540 | 7.03 | 149.8 |
| 14 | 28.6 | $N_2$ | 3.63 | 1800 | 7.96 | 204.4 |
| 23 | — | — | — | — | — | 64.1 |

FIG. 1 is a graph of the Young's modulus of the polyurethane composite containing the treated rubber as a function of the bulk chlorine content of the treated rubber which has been treated in a chlorine/air mixture.

Figure 2:
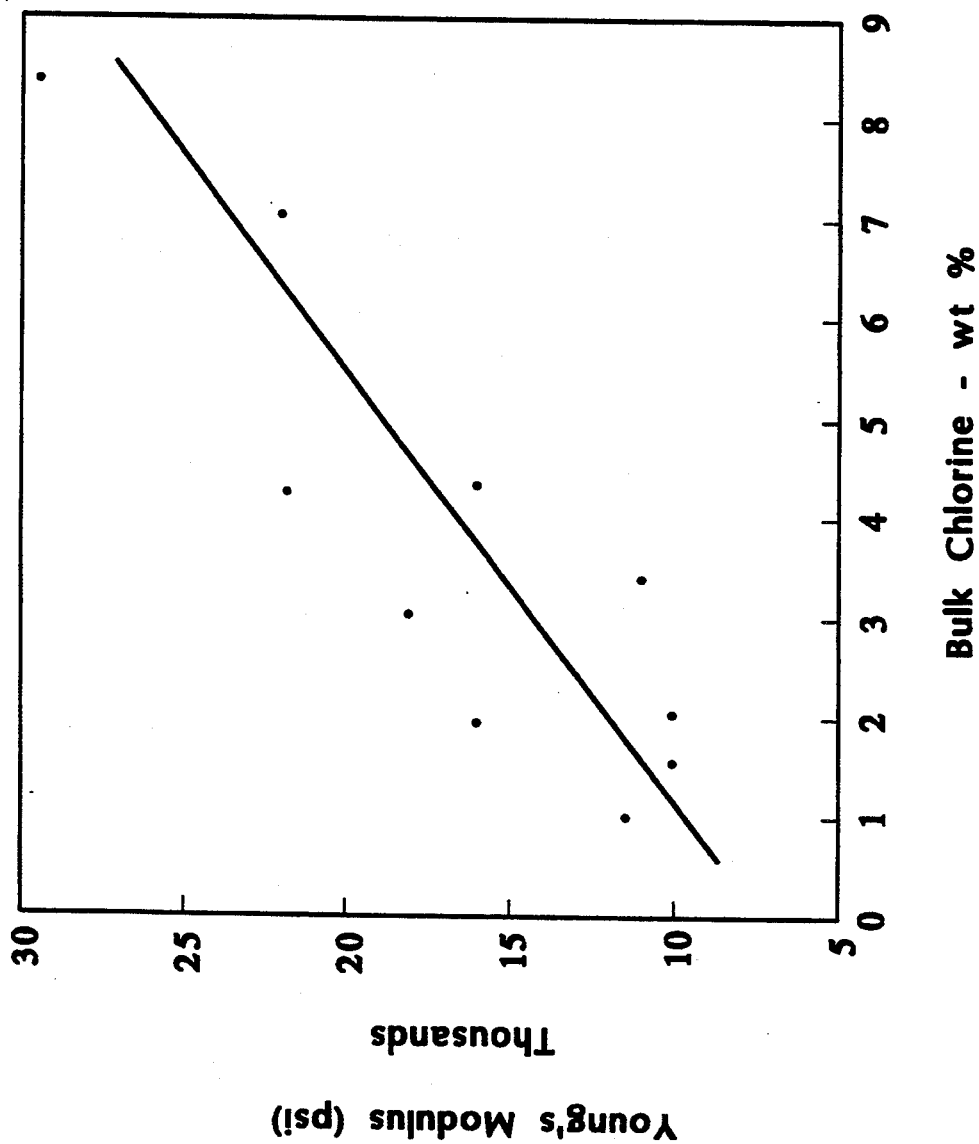
FIG. 2 is a graph of the Young's modulus of the treated rubber as a function of the bulk chlorine content of the treated rubber which has been treated in a chlorine/nitrogen mixture.

FIG. 2 is a graph of the Young's modulus of the polyurethane composite containing the treated rubber as a function of the bulk chlorine content of the treated rubber which has been treated in a chlorine/nitrogen mixture.

Both $Cl_2/N_2$ and $Cl_2$/air treatments of the rubber are effective in increasing the modulus of the rubber, but the effect of the $Cl_2/N_2$ treatment on composite bulk modulus is more pronounced.

Epoxy Composites

Epoxy composites containing 20% by weight rubber were prepared using EPON™ 828 Resin (Shell Chemical Company) and PACM-48™ curative (Pacific Anchor Chemical Co.). The epoxy materials were prepared in much the same manner as the polyurethanes above except that the resins were not preheated and the curing time was typically 2 hours at 80° C., followed by 2 hours at 150° C., followed by slow cooling to 25° C. Twenty percent of 200 mesh scrap tire rubber which was treated with a gas blend of 1% $F_2$/20% $Cl_2$/% air mixture was added to the epoxy used and compared to untreated rubber of the same source. The flexural modulus and the tensile strength (ASTM D638) of the composite samples were measured. The comparative results were as follows:

| Rubber Treatment | Tensile Strength | Young's Modulus |
|---|---|---|
| None | 4890 psi | 92,300 psi |
| $F_2/Cl_2$/Air | 5284 psi | 94,000 psi |

Unsaturated Polyester Composites

Unsaturated polyester composites containing 20% by weight of 80 mesh scrap tire rubber were prepared using COR ™ 61aa Resin and methyl ethyl ketone peroxide. The materials were processed in the essentially the same manner as the epoxy samples above except that the resin was allowed to initially cure at room temperature and briefly post-cured at 100° C. for 4 hours. Rubber which was treated with a 2.5% $F_2$/40% $Cl_2$/air mixture was used and compared to untreated rubber of the same source. The flexural modulus and the flexural strength (ASTM D790M) were measured. The comparative results were as follows:

| Rubber Treatment | Flexural Strength | Flexural Modulus |
| --- | --- | --- |
| None | 13.4 MPa | 1489 MPa |
| $F_2$/$Cl_2$/Air | 23.2 MPa | 1882 MPa |

We claim:

1. A method for increasing the flexural modulus of vulcanized rubber particles comprising contacting the vulcanized rubber particles in a gas/solid phase reactor with a chlorine-containing gas at a temperature and chlorine gas partial pressure sufficient to increase the bulk chlorine content of the vulcanized rubber particles to between about 0.5% and 10%.

2. The method of claim 1 wherein the chlorine-containing gas comprises chlorine having a partial pressure of at least 0.05 atmospheres absolute with the remainder comprising air or nitrogen.

3. The method of claim 1 wherein the chlorine-containing gas comprises chlorine having a partial pressure of at least 0.05 atmospheres absolute together with fluorine having a partial pressure of between about 0.005 and 0.025 atmospheres absolute.

4. The method of claim 2 wherein the chlorine partial pressure of the chlorine-containing gas is between from about 0.1 atmospheres absolute to about 0.5 atmospheres absolute, the reaction of the rubber particles and chlorine-containing gas is carried out at from about 0.5 atmospheres to about 25 atmospheres total pressure and the resulting rubber particles have a bulk chlorine content of from about 1 weight percent chlorine to about 10 weight percent chlorine.

* * * * *